Patented July 7, 1953

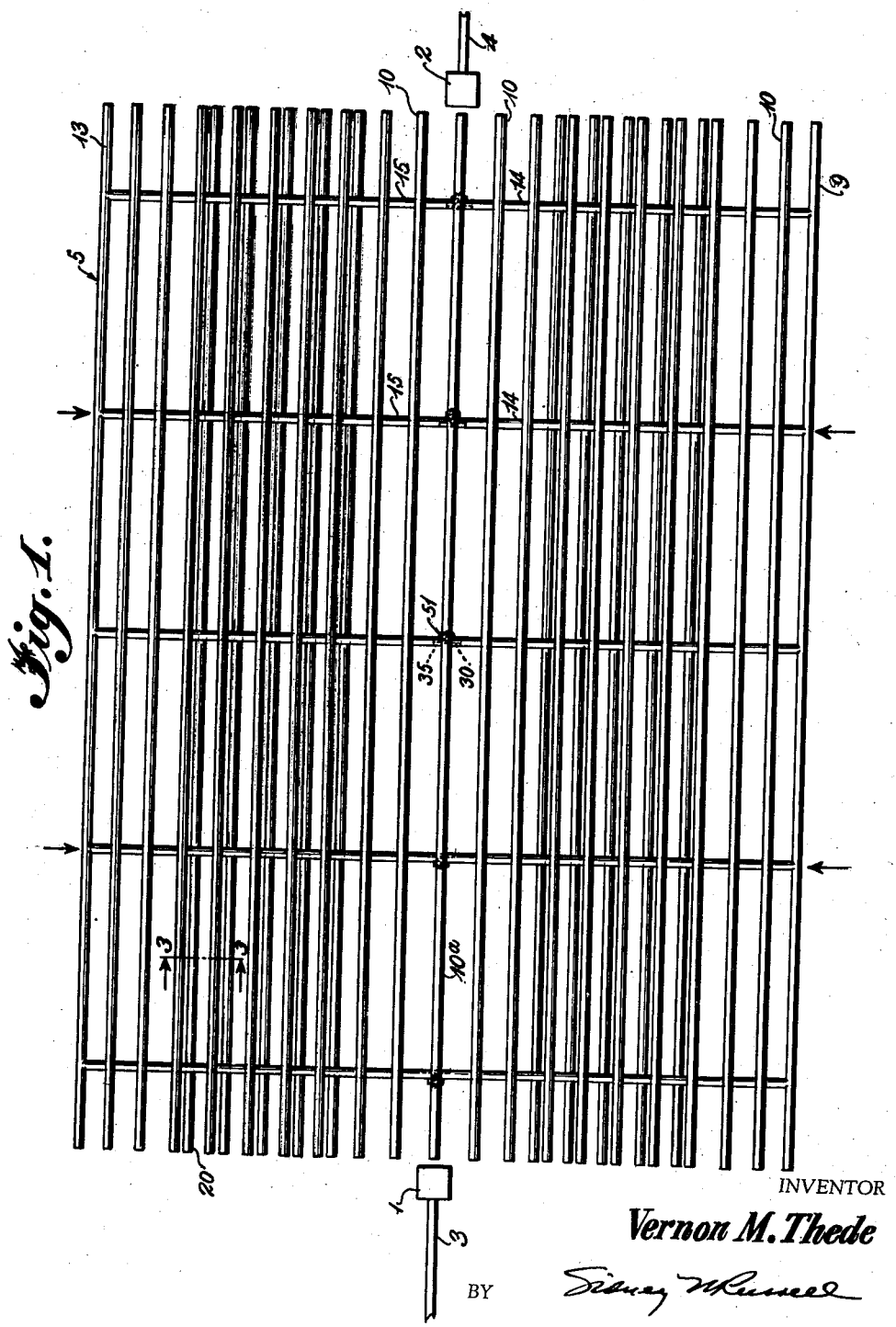

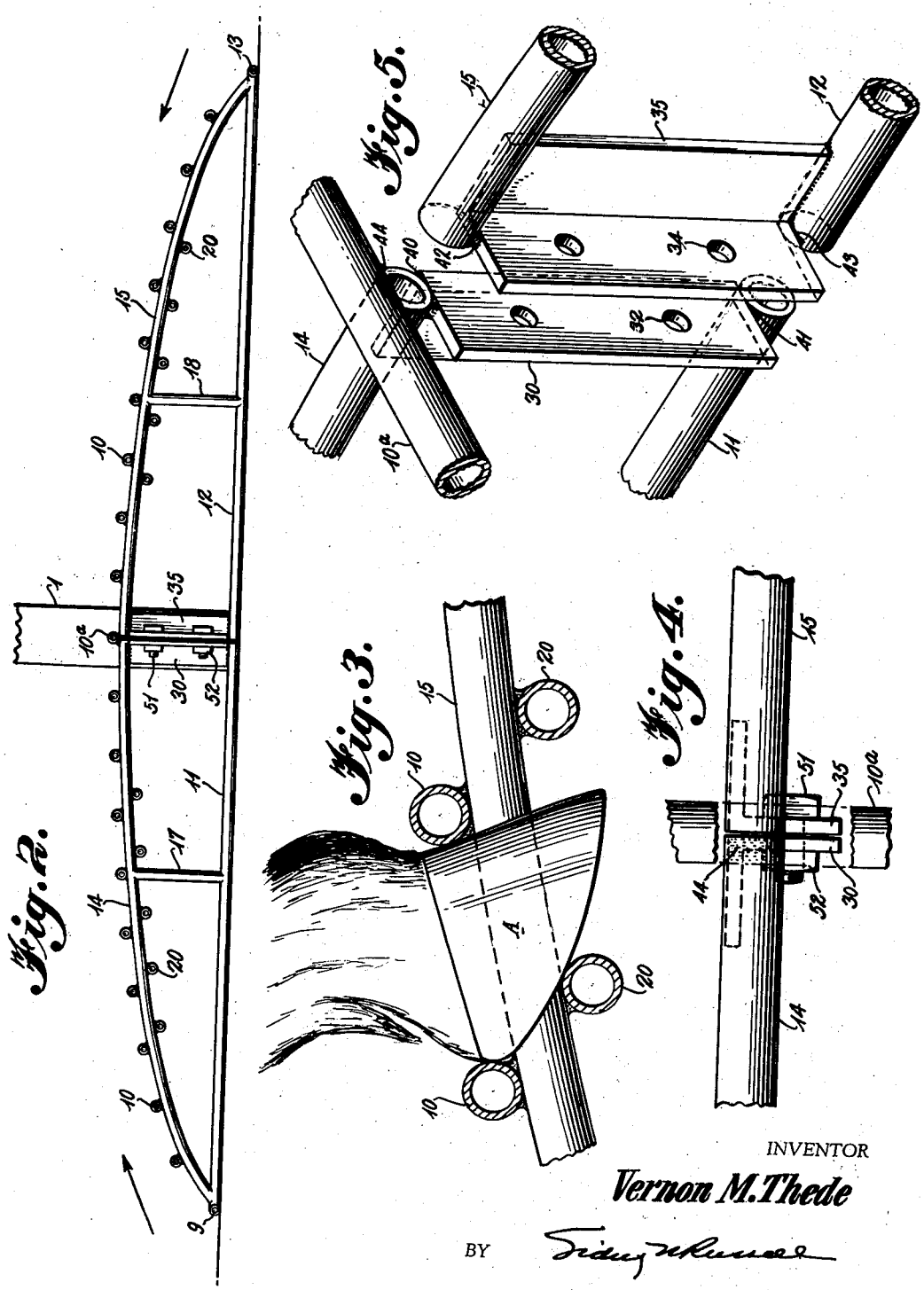

2,644,674

UNITED STATES PATENT OFFICE 2,644,674

DRIVE-OVER METAL CATTLE GATE

Vernon M. Thede, Muscatine, Iowa

Application May 13, 1952, Serial No. 287,581

9 Claims. (Cl. 256—14)

This invention relates to a device commonly known as an animal gate. More particularly the subject matter of this invention may be characterized as a drive-over metal gate which is so constructed that when placed in position in a break in the usual type of fencing it permits the passage thereover of wheeled vehicles or other conveyances, but by reason of its unique construction, prohibits the passage of animals, such as cattle, thereover.

In the past, there have been devised structures designed to accomplish a similar objective. However, such devices usually employ a pit to trap the animal, or use complex mechanical moving parts, such as spikes or revolving spools, or such similar components which are, by and large, expensive to fabricate and thereby impractical for commercial manufacture and sale. The device comprising my invention, in contrast, employs neither a pit as adjunct to its use, nor involves any moving parts whatsoever. It may be fabricated, in its preferred form, of tubular piping which can be rigidly joined together by any suitable method, such as welding or braising. The device exhibits an extreme in simplicity, yet efficiently performs the stated function of affording a cross-over bridge for wagons, etc., while, as stated, preventing egress of animals out of an enclosure.

Accordingly, it is a primary objective of the invention to provide a drive-over metal gate or cattle guard which is of simplified construction, eliminates the necessity of complex moving parts, or the use of a pit for entrapment, and readily performs the function of prohibiting the crossing of cattle or like animals. Briefly, in the performance of the device an animal is hindered from crossing by the twisting of the hoof thereof in such manner that the animal is immediately brought to its knees and can proceed no further. It then raises itself upon its hind legs and withdraws.

It is a further object of this invention to provide a metal drive-over gate of the described nature which is collapsible, that is, can be made in several component parts for ease of shipment and then readily assembled and mounted for immediate use.

It is a further object of the invention to provide a mechanism of the type described in the foregoing, that lends itself to mass production and can be fabricated at extremely low cost.

Other objects and advantages of this invention will be apparent from the following more particularized description. In this description, reference will be made to the several drawings of the invention wherein:

Figure 1 is a plan view of the invention;

Figure 2 is a side elevation of the invention as shown in Figure 1;

Figure 3 is an enlarged fragmentary section taken on the line 3—3 of Figure 1;

Figure 4 is an enlarged fragmentary plan view of a connecting joint utilized in conjunction with the invention, and Figure 5 is a fragmetary isometric view of the connecting joint structure shown in Figure 4.

Referring more particularly to the drawing, it will be seen that the structure is, of course, positioned between the break in the two end portions of a fence such as indicated at 3 and 4. As here shown, these end sections may terminate in the usual upright fence posts 1 and 2.

The invention, herein depicted, as comprising a series of arches, is generally indicated in Figure 1 at 5. It will be seen that a series of transverse bars 10 are mounted upon several arched supports here indicated as being in two sections. Thus each arch comprises two segments 14 and 15. It is evident that sections 14 and 15 may be made in one piece, but, as will later be seen, in the preferred embodiment of the invention the device, for the sake of portability, is made in sections which can be readily affixed together at the desired location.

The shape of this arch is approximately that of a partial ellipse with each opposing end of the arches 14 and 15 having a sudden break downwardly for the obvious purpose of being convenient for reception of any type of wheeled vehicle. The specific shape of the arch may be altered, however, to suit different conditions. The arch is supported upon a longitudinal base member, here shown as also being comprised of two sections, 11 and 12, and these base members at their opposite ends are affixed to two transverse members 9 and 13 which extend across each end of the structure.

Each of such arches is supported intermediate its length by preferably at least three uprights, such as are shown in Figure 2, and indicated at 17 and 18, respectively. In Figure 2, the third or center upright may be a member similar to, for example, 18, but as herein shown, is of a different structure to permit breakdown. This will be hereinafter referred to.

It is evident that any number of arch support uprights may be used. However, in most cases, three will be sufficient.

Underneath the described segmented arches, 14 and 15, are also mounted an additional series of transverse bars 20. In the description of the invention thus far, it is to be observed that these bars 20 as well as their complementary bars 10 and the arch members, the uprights and base members 11 and 12 are all fabricated, in the preferred embodiment of the invention, of tubular steel piping of 1$\tfrac{1}{16}$ inches in outside diameter. Equivalent media, such as solid or square bars, may, of course, be employed.

To effectuate the purposes of the invention thus far described, it is to be noted that the positioning of the transverse bar members 10 and 20, respectively, is of critical importance. In the preferred embodiment the height of the arch is approximately 10 inches and, as indicated in Figure 1, the arch is 8 feet long (this distance referring to the cross-over distance), and 12 feet wide. Again, in Figure 1, are shown a total of nineteen transverse members 10 which are preferably spaced about 4 inches apart, sufficient, in this instance, to permit the passage therebetween of a cattle hoof. The underneath transverse members 20 are located to one side of members 10 as indicated in Figure 2. This distance to the side of members 10, in the preferred embodiment, is ½ inch. Thus, again referring to Figure 2, each of the underneath transverse bars 20 is located 1 1/16 inches (the outside diameter of the several arches) below members 10, and ½ inch—considering the outside diameter of the respective bars— to one side of the bars 10 on top of the arch.

As shown herein, there are ten bars or tubular members 20 located underneath the several arches, of which there are five in number. Such bars 20 commence a substantial distance from each end of the arch, the first one in each case being adjacent but underneath the third top bar on each side of the arch.

The distances recited in the foregoing may be varied within certain limits, obviously, where the invention is used as a gate for animals of different size. Generally the space between the transverse pipes 10 is such to permit the passage of an animal's hoof therethrough. Looking from either side of the cross-over in the direction of the line of travel through the gate and up to the center line thereof, the lower transverse pipes 20 are slightly forward of bars 10. This distance forward is of such amount that when an animal's hoof passes between members 10, the after part or heel of the hoof, as clearly shown in Figure 3, collides with lower bar 20, causing the animal to stumble. The relationship of upper rods 10 to lower rods 20 may be described as staggered.

This relationship of distance between these several elements has been described in some detail, as it is this feature which lends operability to the invention, although it will be evident that some departure therefrom is possible. Obviously, although five arches are herein disclosed, a lesser or greater number can be employed, and the same is true of the number of transverse top and bottom bars 10 and 20 respectively. In any event, it will be seen that, referring to Figure 3, an animal can progress forwardly through two of the topmost bars 10 on each side of the respective arches. When, however, he reaches the third and inserts his foot between the third and fourth of such bars 10, viewing the device from the approach position, his foot, in going downwardly through the same, will impinge upon one of the underneath bars 20. As stated, this will cause the forepart of the hoof A of the animal to be pivoted forwardly and downwardly and this action consequently results in tripping the animal so that it will be forced to fall upon its knees. It is then completely unable to proceed forwardly any further over the gate. Its hind legs naturally remain upon the ground, and in extricating itself, it pulls itself backwardly out of the gate.

The distance between the top bars 10 is such, however, that the ordinary type of vehicle can readily pass thereover. In this embodiment of the invention the arches, as hereinbefore described, are only 10 inches in height, and can offer no considerable obstruction to any ordinary type of conveyance.

For purposes of convenience, and adaptability, the entire device may be constructed in portable segments which are readily affixed together as shown in the erected form of the invention in Figure 2. To this end, each of the arches can be broken at the center thereof to provide two respective segments which have hereinbefore been referred to as arches 14 and 15.

Suitable means is provided for reconnection of these arched segments. Such means is more particularly shown in Figures 4 and 5 wherein it will be seen that an angle iron may be positioned between the arched members 14 and 15 and their respective bottom members 11 and 12. Such angle irons 30 and 35 can be suitably secured to the segmented arches and bottom members as by welding at 40, 41, 42, and 43 or by other suitable media, as by braising or riveting thereto. Each of the respective angle pieces 30 and 35 are in turn provided with suitable apertures as at 32 and 34. The latter are adapted to receive a bolt 51 threaded at its opposite end for the reception of the usual type of nut 52. It will be appreciated that when this construction is positioned as shown in Figure 5, the several bolts 51 can be used to draw together the two angle irons which will, of course, in turn force together the several segmented arches.

Since the arches are broken at the center in this portable form of the invention, it is apparent that the center transverse bar member 10, indicated at 10a in Figure 5, must be welded upon one side as at 44 to either arch 14 or arch 15. In the embodiment here described, the member 10a is shown as welded upon one side thereof to the member 14.

This type of interconnection of the segmented portions of the invention can be repeated throughout. Referring to Figure 2, it is quite obvious that instead of the device simply being broken at its center, it may be broken at the places where the uprights 17 and 18 intercept the arches, and these respective uprights can be replaced by the interconnection hereinbefore referred to and shown in Figures 4 and 5. I have found, however, that since the entire device is comparatively light in weight and yet extremely rigid and durable, satisfactory results may be obtained if the arches are broken only at the center in the manner hereinbefore described.

It will be appreciated that by the construction herein described, no pit such as is usual in the art need be employed to hinder an animal from crossing. Furthermore, the critical positioning of the topmost and underneath transverse bars results in bringing an animal to its knees in the described manner so that pinching devices, roller spools, or wedge implements with their consequent relatively complex structure, are eliminated.

It is further obvious that it may be necessary to provide some type of wing in the center of each end of the gate to prevent a large animal from going around the end of the fence where it touches the arched gate. Such type of wing devices are known in the art and this invention is more immediately concerned with the gate or cross-over itself and the peculiar construction thereof which efficiently retards an animal's progress through the gate opening.

It is further apparent that this cross-over gate may be made of varying widths and depths to render it suitable for various conditions. However, the peculiar relationship of the topmost and underneath transverse bars should be retained, within sensible limits in each case, as it is this relationship which promotes the operability of the entire structure.

Although this invention may be varied in the instances noted and varied as well in many other ways, other expedients or alternates being employed to accomplish the purposes hereof, it is to be understood that my invention is only limited by the scope of the following claims.

I claim:

1. In an animal guard of the character described, at least two arched supports, upper transverse cross bars on said supports sufficiently spaced to permit the passage of an animal's hoof therethrough and lower transverse cross members mounted to one side of and in parallel relationship with said upper cross bars, whereby impingement of the hoof on said lower member will trip said animal.

2. In a device of the character described, a plurality of arched rods forming an arched support, cross bars mounted on top of said rods, transverse cross members below said rods, said cross members being spaced to one side of said bars and toward the center of said support a distance less than the outside diameter of said cross members.

3. In a device of the character described, a plurality of opposing and parallel supports, each of said supports having an arched upper surface higher at the center than the ends thereof, upper parallel bars on and transverse to said supports, said bars being sufficiently spaced to permit the passage of an animal's hoof therethrough, lower spaced parallel bars adjacent to said upper bars, said lower bars being spaced to one side of the upper bars a distance less than the distance between said upper parallel bars whereby an animal is tripped by impingement of the hoof on one of said lower bars.

4. In a cattle guard, at least two opposing and parallel arched rods, the external surfaces of which form a partial ellipse, each of said rods connected to a straight base member, intermediate supports between each of said rods and said respective members, spaced and parallel straight rods on top of and transverse to said arched rods, spaced and parallel elements adjacent and below said straight rods, said elements being spaced to one side of said rods a predetermined distance toward the center of said partial ellipse, said distance being substantially less than that between said parallel straight rods.

5. In a cattle guard of the described type, a plurality of parallel support rods forming an arch, said arch approximating a partial ellipse, the respective ends thereof curving more sharply than the middle of said arch, a series of parallel rod elements on the outer side of said support rods, a series of parallel rod members on the inner side of said support rods, said members and said rods being staggered with respect to each other, each of said members being displaced laterally to one side of its adjacent rod element, whereby the hoof of an animal is engaged and tripped thereby.

6. In a cattle guard of the character described, a plurality of parallel support rods of similar configuration forming an arch approximating a partial ellipse and terminating in ends having a sharper curvature than the middle thereof, a series of parallel rod elements mounted on top of said support rods, a series of parallel rod members mounted underneath said support rods, said elements being sufficiently spaced to permit the passage of an animal's hoof therebetween, said members being in staggered relationship with respect to and between said elements, each of said members being spaced laterally to one side of its adjacent rod element at a distance approximating the diameter of said parallel rod members, whereby said animal is tripped when the hoof thereof impinges on said members and is confined between said elements.

7. In a cattle guard of the character described, a plurality of parallel support rods of similar configuration forming an arch approximating a partial ellipse and terminating in ends having a sharper curvature than the middle thereof, a series of parallel rod elements mounted on top of said support rods, a series of parallel rod members mounted underneath said support rods, said support rods being comprised of at least two equal segments, each of said segments having means thereon for affixing said segments together, said elements being sufficiently spaced to permit the passage of an animal's hoof therebetween, said members being in staggered relationship with respect to and between said elements, each of said members being disposed laterally towards the center of said arch with respect to its adjacent parallel rod element a distance approximating the diameter of said members, whereby said animal is tripped when the hoof thereof impinges on said members and is confined between said elements.

8. A cattle guard adapted to be positioned on the surface of the ground comprising a pair of spaced supporting bars arranged above said surface, transverse upper cross members mounted on the top sides of said supporting bars, said upper cross members being spaced from each other a distance sufficient to permit the passage of a cattle hoof therebetween, transverse lower cross members corresponding to said upper cross members mounted on the undersides of said supporting bars, each of said lower cross members being spaced to one side of its corresponding upper cross member a distance less than half the distance between an adjacent pair of said upper cross members.

9. A cattle guard comprising a pair of side members, means for supporting said side members above the ground surface, first transverse members mounted on the top sides of said side members and second transverse members corresponding to said first transverse members mounted on the under sides of said side members, the adjacent first transverse members being spaced a distance apart slightly greater than the length of a cow's front hoof, said second transverse members being disposed between adjacent first transverse members whereby when a cow's front hoof is received between a pair of adjacent ones of said first transverse members and in a supported position on a second transverse member a cow is tripped and forced to fall upon its knees.

VERNON M. THEDE.

References Cited in the file of this patent

UNITED STATES PATENTS

| Number | Name | Date |
|---|---|---|
| 495,098 | Mahoney et al. | Apr. 11, 1893 |
| 774,130 | Bartlett | Nov. 1, 1904 |
| 1,478,927 | Tomlinson | Dec. 25, 1923 |

FOREIGN PATENTS

| Number | Country | Date |
|---|---|---|
| 4,052 | Australia | July 14, 1927 |